Aug. 23, 1927.

M. W. SELLS 1,639,706

MACHINE FOR HANDLING AND TREATING CORN

Filed Sept. 13, 1924   3 Sheets-Sheet 1

Inventor:
Millar W. Sells
By G. W. Graham
Atty.

Aug. 23, 1927.  
M. W. SELLS  
1,639,706  
MACHINE FOR HANDLING AND TREATING CORN  
Filed Sept. 13, 1924    3 Sheets-Sheet 3

Inventor:
Millar W. Sells.
By D. W. Graham

Patented Aug. 23, 1927.

1,639,706

UNITED STATES PATENT OFFICE.

MILLAR W. SELLS, OF BUFFALO, NEW YORK, ASSIGNOR TO PEERLESS HUSKER COMPANY, INC., OF BUFFALO, NEW YORK.

MACHINE FOR HANDLING AND TREATING CORN.

Application filed September 13, 1924. Serial No. 737,579.

This invention relates to an improved machine for treating sweet corn in the husk prior to canning whereby the husks are more perfectly removed and the tender kernels are damaged less than has heretofore been possible.

Sweet corn as grown commercially produces ears of varying diameters and lengths, ranging from what is popularly termed "nubbins" to quite large full ears.

The corn is husked quite green and of course the ears are dumped promiscuously into the husking shed at the cannery and as they are conveyed to the machines for treating them prior to canning the sizes are thoroughly mixed and no effort whatever is made to sort them. Little and big; short and long follow each other in endless procession through the various machines constituting the corn cutting equipment.

The very first operations on the ear in the husks might properly be said to be the most important. The husks and silks adhere quite firmly to the ears and require considerable accurate manipulation in the preparatory machines in order to have them conditioned for perfect and easy removal by the subsequent operations.

All ears as pulled from the stalks in the field have more or less of what is termed a "butt", which is an extension of the cob to which the husks are securely attached.

The very first operation necessary in the pre-treatment of the ears is to cut off this butt and with it the ends of the husks just at the first row of kernels. This releases the husks so that their only remaining attachment to the ears is through their wrapping contact which is not at all secure after the butt is removed.

Following the removal of the butt, or, at the same time, the ear with the adhering husks is passed between hooked members that engage the husks and shred them somewhat so that the husking mechanism will have a fair chance of gripping the husks and silks and completely remove them.

The problem in machines of the type to which my invention belongs is to properly and surely place each ear in correct alignment so the mechanism removing the butt will do so at exactly the desired place relative to the first row of kernels on each ear.

It is therefore a principal object of my invention to provide a mechanism for aligning the ordinary run of ears of corn whereby each will receive the same aligning action irrespective of its length or diameter.

It is a further object of my invention to provide a machine for the purpose specified that will require no adjustments whatever to enable it to handle ears of the extremes of length and diameter.

It is a further object of my invention to provide an aligning device that will handle, effectively, ears of the utmost extremes in size by means of comparatively slow moving mechanism so as to eliminate undue wear and upkeep and that will permit of passing a greater tonnage per hour or per day without impairing in the least the efficiency of the machine, and this without the necessity of extreme care on the part of the operator in placing the ears of corn in the machine.

Another object of the invention is to provide an aligning device having continuous movement by contact and with interlocking engagement with the conveyor that carries the ears of corn into and through the machine.

With such objects in view as well as other advantages inherent in the invention, the novel structural peculiarities, novel organization of elements, and the separate and collective operations involved in carrying out the recited objects of my invention, which will be made the subject matter of claims hereto appended, I wish it to be understood that the several necessary elements and combinations constituting the same may be varied in their proportions, placement, general arrangement and operative relation without departing from the scope and nature of my invention.

Reference being now had to the accompanying drawings a clearer and better understanding of the general operation and arrangement of the machine will be had, wherein.

Figure 1:
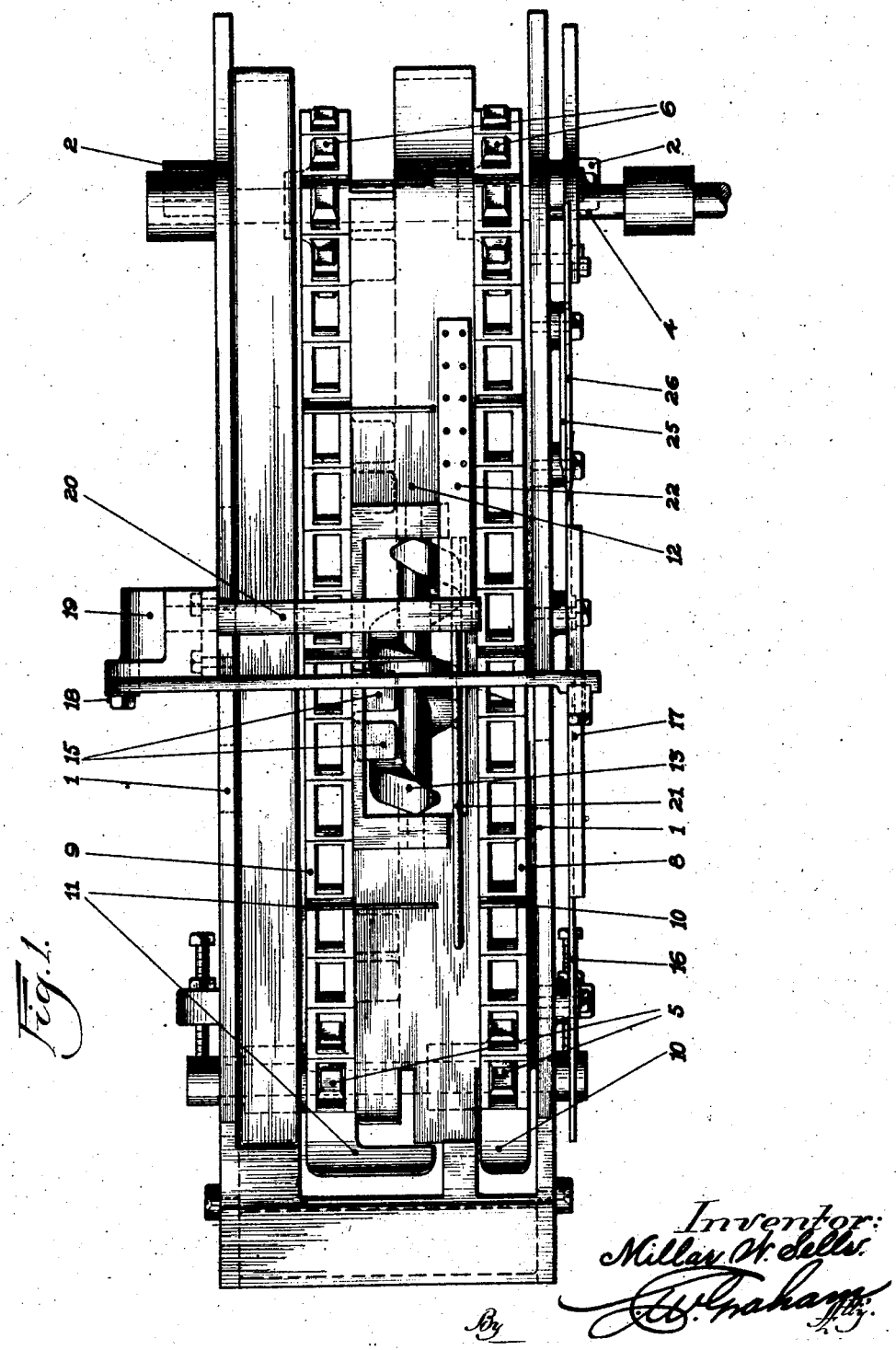
Fig. 1 is a plan of the machine showing the various parts and combinations in their correct operative relation.
Figure 2:
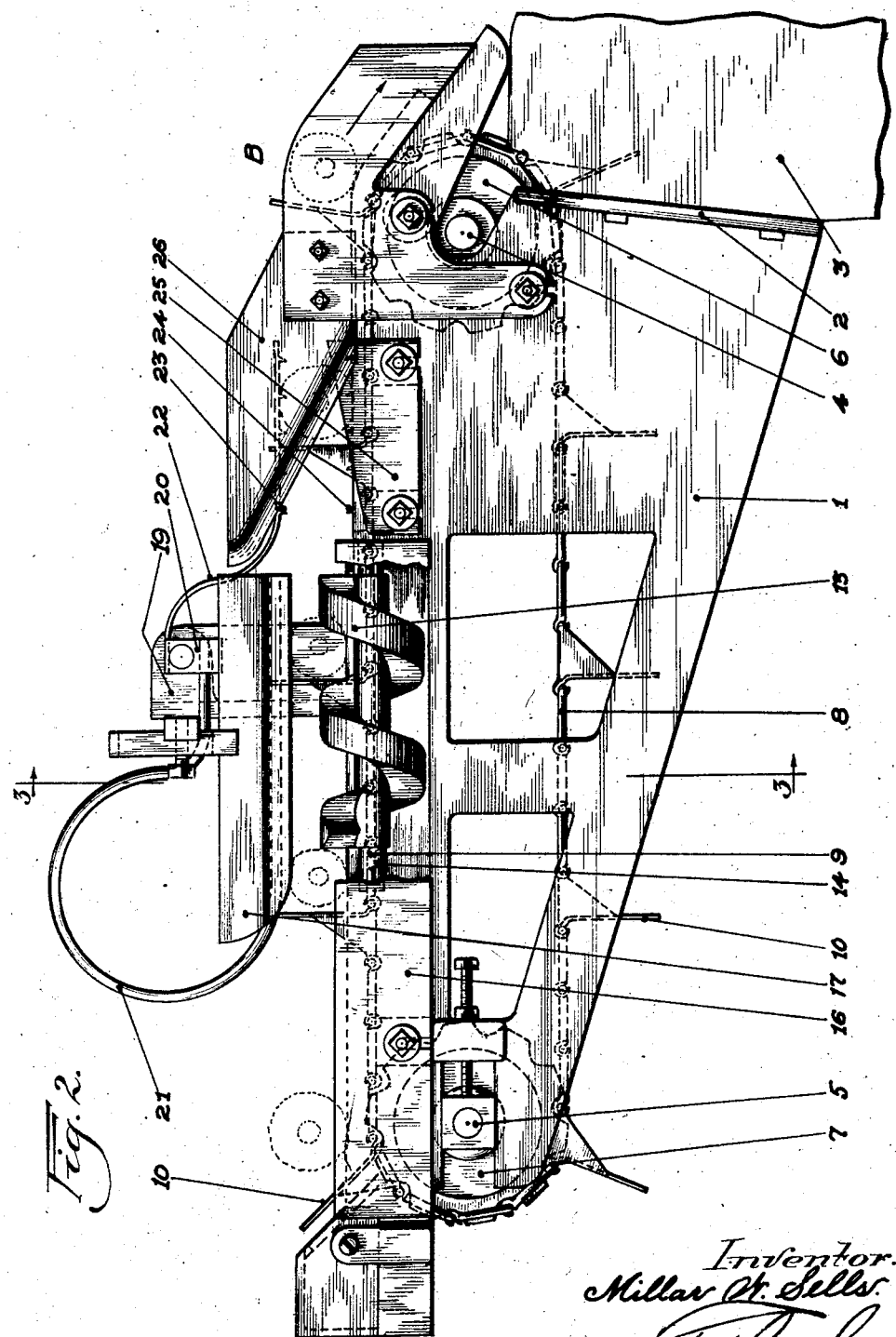
Fig. 2 is a side elevation of the machine with some parts broken away to better show the mechanism.

In Fig. 1 I have shown my improved device as an independent unit, but in Fig. 2 I have indicated the manner of connecting this part of the machine with the final husk removing part.

These machines are seldom if ever used and operated independent of the husker, for many years the practice has been to construct the butt cutting and the husking mechanism on practically the same frame work so that they operate as a single contained unit, and this is necessary in order to have the feeding of the butted ears in synchronism with the operation of the husking part of the apparatus, and to eliminate any possibility of the ears being turned or otherwise misaligned in their transition from the butt cutting station to the husking station, and further to eliminate the extra labor usually necessary between the two operations.

In the drawings showing an embodiment of my invention the numeral 1 indicates a pair of side frames having flanges 2 by means of which the apparatus is bolted to and made a part of the husker proper. 3 indicates the end of the husker, or rather the side to which the frames 1 are bolted or otherwise secured thereto. Mounted at either end of the frame members 1 are shafts 4 and 5, carrying the sprockets 6 and 7 which in turn carry the main feed chains 8 and 9 on which are mounted integral with spaced apart links the flights 10 and 11, which flights are the means for carrying the ears of corn through the machine with their axes at right angles to their direction of travel. 12 represents a feed table bed bolted between the side members 1—1, this bed 12 has located in its upper surface chain tracks in which the chains 8 and 9 ride from end to end. Located centrally in this feed table 12 is a rectangular opening in which is mounted for rotation the Archimedean screw member 13 which finds bearings in the feed table bed 12 as at 14. On the feed chain 9, at regular spaced intervals are driving lugs 15 arranged in pairs on adjacent links of the chain 9, these lugs 15 have a combined width just about equal to the space or lead of the thread on the screw 13 and are adapted to enter the thread and by contact therewith, rotate the screw 13 as they are moved forward by the chain 9. There is a longitudinal slot through the feed table bed 12 in which the lugs 15 ride which covers them up during their travel and by being so confined they have a steadying effect on the chain 9 and prevent it from tipping. The only time these lugs are exposed on the top of the machine is when they are passing through and driving the screw 13.

Arranged on one side of one of the frame members 1 is an adjustable butt gauge 16. Located directly over this gauge 16 and cooperating therewith is a movable butt gauge 17, also having vertical adjustment and being pivoted at 18 to an extension member bolted to the frame 1 as indicated at 19. Extending from the member 19 laterally over the machine is a bracket 20 to which is secured a spring presser member 21 adapted to have a downward pressing action on the ears as they are propelled thereunder thus holding them down into the thread of the screw 13 so the screw may have proper contact to push them against the gauges 16 and 17. Extending from the cross member 19 is also another spring member 22 carrying spurs 23 on its under side which cooperate with companion spurs 24 located on the feed table bed 12. These spurs act to tear and loosen the husks so that the husking rolls may get a good grip to pull them off the ears.

The butting knives are indicated at 25 and 26 being secured to the frame work of the machine as shown.

"A" represents the feed end of the machine where the unhusked ears are laid by an operator with the butts all pointing in the proper direction, while "B" represents the discharge end of the machine where the ears are discharged directly into the husker rolls or onto automatic mechanism that will convey them to the husking mechanism.

The operation of the machine embodying my invention will be substantially as follows:

The ears placed on the feed table by the operator will be engaged by the flights 10 and 11 carried by the feed chains 8 and 9 and conveyed longitudinally of the machine with their axes at approximately right angles to their path of travel, and on account of the greatly extended area of flight surface of the flights 11 the ear will be held and conveyed without much displacement due to its frictional contact with the top of the feed table.

Figure 3:
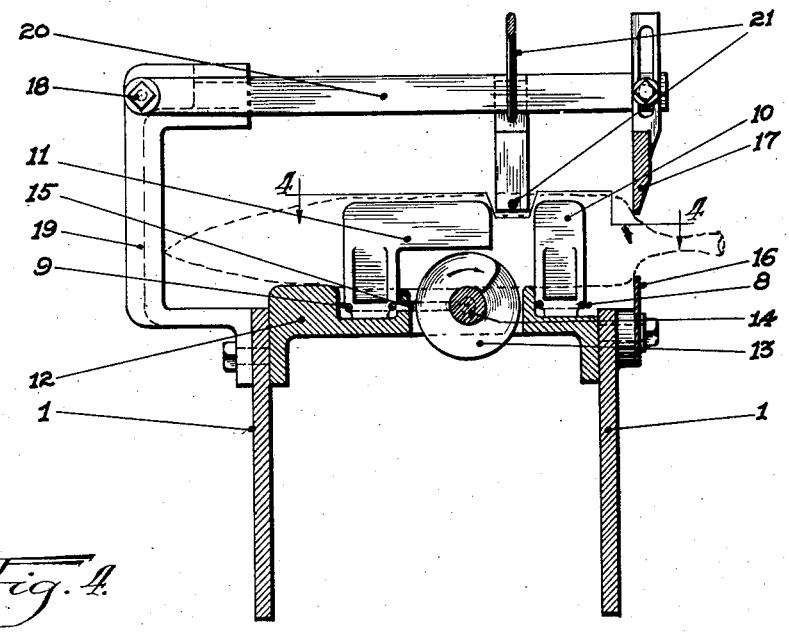
Fig. 3 is a sectional elevation taken on approximately the line 3—3 of Fig. 2 and showing in dotted lines the approximate location of an ear of corn properly aligned to have the butt removed.
Figure 4:
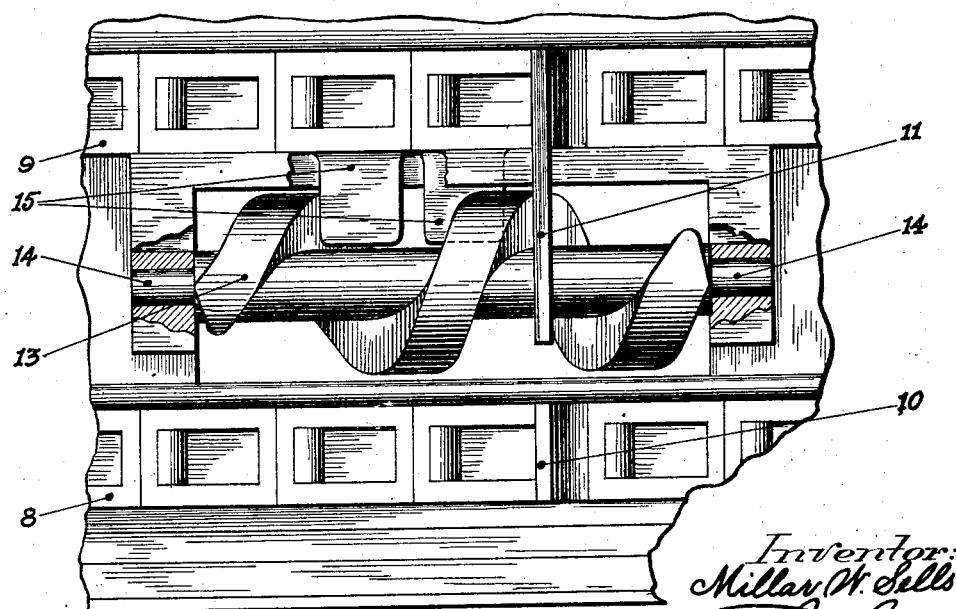
Fig. 4 is an enlarged detail of the aligning mechanism with part of the structure omitted from the top to better illustrate this part of the machine.

As soon as the conveyor chains 8 and 9 begin to move. the lugs 15 on the chain 9 engaging the thread of the worm or screw 13 will rotate the screw 13 in the direction of the arrow on Fig. 3. The pitch or lead of the thread on the screw 13 is such that the largest ear of corn will rest in the hollow of the spiral, and of course all smaller ears will rest likewise.

As soon therefore, as the ears conveyed by the feed chains, reach the location of the screw 13 they will enter between the spiral of the thread and immediately through contact with the thread of the screw they will be urged toward the butting gauges 16 and 17, and since they will be pressed down against the screw by the presser action of the spring 21 the frictional contact against the screw thread will be sufficient to push each ear tightly against the gauges 16 and 17, which means that each and every ear will be properly gauged before it reaches the butting knives, and since the ears are spaced far enough apart to permit of individual alignment before the following ear enters the aligning screw it matters not whether the ears are short, long, thick or thin, each will be acted on in exactly the same manner by the aligning screw. The frictional retarding action of the spring member 21 will have the effect to hold each ear back against the flights on the feed chains and at the same time against the thread of the worm or screw 13, the timing and synchronizing of the various cooperating parts being such that this condition will prevail with each and every ear that passes through the machine.

It will be particularly noted by reference to the drawings that the bottom of each ear is located in a practically fixed plane as it passes over the feed table, this is also true of the side of the ear touching the flights 10 and 11. Thus two sides of every ear no matter what its length or diameter are always located in these two positions and as they are the two sides that are acted upon by the aligning mechanism it is seen that every ear will respond in practically the same manner to this condition. The movable aligning gauge 17 and the presser spring 21 move according to the diameter of the ear so that they automatically hold each ear in exactly the same manner while the aligning screw is pushing the ear against the gauges 16 and 17.

The operator in placing the ears of corn on the feed table need not exercise any particular care in placing the ears thereon except to get them laid crosswise and with the butt toward the gauging side of the machine. The urge of the screw thread and the center portion of the screw contacting with the husks will move the ear whatever distance may be necessary to place it against the aligning gauges, and if the ear reaches the desired gauging position before passing out of the influence of the screw 13, the screw simply slips along the ear and tends to hold it in position of alignment. The speed and timing of the screw is such that the longest ear will be properly gauged before it will have passed through the screw.

The ears now being properly gauged are passed along by the continuously moving chains 8 and 9 and are thereby moved into and through the butt cutting knives 25 and 26 when the butts will all be cut off just below the first row of kernels and the husks will be more or less torn and shredded by the spurs 23 and 24 when the ears will be passed to the point "B" where they are discharged as previously stated.

After the foregoing description of the construction and operation of my improved ear aligning and cutting machine it can be readily seen that I have provided a machine embodying the utmost simplicity and with the minimum of moving parts, the upkeep of which will be negligible and the durability of which will be almost unlimited. Chains of the type used are from regular stock and can be procured in any market and the other moving parts are so simple that any mechanic about a canning factory will be able to keep them in perfect operating condition.

On account of the principle involved in this invention and the simple mechanism required to carry it out I have found that the machine may be speeded much faster than other types of machines doing this same work and thereby pass a much greater tonnage through the machine in a given time than has heretofore been possible. Varying lengths and diameters of ears have no effect whatever on the consistent operation of the machine, the shortest and stubbiest ear possible may be followed by a large long ear and both will be treated as though it was the only one in the machine, each being perfectly aligned against the gauges, and the fact that no adjustment is ever necessary to adapt the machine to these extreme conditions of operation is evidence of its utility and novelty in the field of corn canning machinery.

Having thus described my invention what I claim as new and desire to secure by Letters Patent is:

1. A machine for aligning ears of corn for treatment comprising conveying means for moving ears along a pathway, means operable from contact with said conveying means for engaging said ears and moving them into the desired aligned positions.

2. A machine for aligning ears of corn for treatment comprising conveying means for moving ears along a pathway, rotatable means operable from contact with said conveying means for moving said ears into the desired aligned positions.

3. A machine for aligning ears of corn comprising two conveyors moving in unison for conveying ears along a pathway, means operable from contact with one of said conveyors for moving said ears into the desired aligned positions.

4. An apparatus for aligning ears of corn comprising two conveyors moving in unison for conveying ears of corn, rotary means operable from contact with one of said conveyors for moving said ears at approximately right angles to their path of travel into the desired aligned positions.

5. An apparatus for aligning ears of corn comprising two conveyors for moving ears of corn along a pathway, means positioned between said two conveyors and operable from contact with one of them for moving said ears into the desired aligned positions.

6. An apparatus for aligning ears of corn comprising means moving in a lineal direction for conveying ears of corn, means having rotary movement and operable from said lineal moving means for moving said ears into the desired aligned positions.

7. An apparatus for handling ears of corn comprising means for moving ears in succession along a pathway, means operable from said moving means for aligning said ears while passing therethrough, means above said pathway for holding said ears into operative relation with said aligning means.

8. An apparatus for handling ears of corn comprising continuously moving conveyors for moving ears along a pathway, means operable from one of the said conveyors by frictional contact for moving said ears into the desired aligned positions.

9. An apparatus for handling ears of corn comprising continuously moving conveyors for moving ears along a pathway, rotatable means operable from one of said conveyors by frictional contact for moving said ears into the desired aligned positions.

10. An apparatus for handling ears of corn comprising means for moving ears along a pathway, means operable from said conveyor by frictional contact for moving said ears into the desired aligned positions.

11. An apparatus for handling ears of corn and aligning the same axially with respect to one end thereof comprising means for moving said ears along a pathway, other moving means operable from contact with said first mentioned moving means for engaging said ears and moving them into the desired aligned positions.

12. An apparatus for handling ears of corn and aligning the same axially with respect to one end thereof comprising continuously moving conveying means for moving ears of corn along a pathway, rotary means operable from said continuously moving conveying means by frictional contact therewith for moving said ears of corn into the desired aligned positions.

13. An apparatus for handling ears of corn and aligning one end thereof against gauges, comprising means for moving ears along a pathway, means operable by said moving means for moving said ears into alignment, gauges along the pathway of said moving ears against which they are moved by said moving means.

14. An apparatus for handling and aligning ears of corn against gauges comprising a conveyor system for moving ears in succession, rotatable means for engaging said ears and moving them into alignment, said means being operable from said conveyor system, one fixed and one movable gauge for locating said ears and means for treating said ears after alignment.

15. An apparatus for handling and aligning ears of corn comprising a conveyor for moving ears longitudinally, an aligning member operable from said conveyor for moving said ears laterally, gauges against which said ears align and means for treating said ears.

16. A machine for moving, aligning and treating articles, comprising conveying means for receiving and moving articles along a pathway, means intercepting said pathway and operable from contact with said conveying means for aligning said articles, and means following said aligning means for treating said articles.

17. A machine for moving, aligning and treating articles, comprising conveying means for receiving and moving articles along a pathway, rotary means intercepting said pathway and operable from contact with said conveying means for aligning said articles, and means following said aligning means for treating said articles.

18. A machine for moving, aligning and treating articles, comprising conveying means for receiving and moving articles along a pathway with their axes at right angles to their line of movement, means intercepting said pathway and operable from said conveying means for moving said articles along a line parallel to their axes, into alignment, and means following said aligning means for treating said articles.

19. A machine for moving, aligning and treating articles, comprising a pair of conveyors for receiving and moving articles along a pathway, with their axes at right angles to their line of travel, rotary means intercepting said pathway for engaging and aligning said articles, means on one of said conveyors for engaging said rotary means and imparting rotary motion thereto, with means following said aligning means for treating said articles.

20. An apparatus for moving, aligning and treating articles comprising a pair of continuously moving conveyors, an Archimedean screw located in the path of said conveyors and operated by contact therewith, and adapted to engage articles moved by said conveyors and place them in a desired alignment, with means following said alignment for treating said articles.

21. An apparatus for moving, aligning and treating articles comprising a pair of continuously moving conveyors, an Archimedean screw located in the path of said conveyors and adapted to engage articles moved by said conveyors and place them in a desired alignment, said Archimedean screw veyors, with means following said alignment of said articles for treating said articles.

22. A machine for moving, aligning and treating ears of corn comprising a conveyor system for receiving and moving ears in succession, an Archimedean screw arranged adjacent said conveyors, means on said conveyors for engaging said Archimedean screw and imparting continuous rotation thereto, whereby said ears of corn are given a desired alignment with means following said alignment for removing a portion from one end of each ear.

23. A machine for butting corn comprising a conveyor system for moving ears, continuous rotary means operated from contact with said conveyor system for aligning said ears and butt removing means for removing the butts after alignment.

24. A machine for handling, aligning and treating ears of corn in the husk for subsequent removal of said husks, comprising continuously moving conveying means for receiving and moving ears of corn in substantially parallel arrangement but in unaligned lateral arrangement along and into operative relation with lateral aligning means whereby said ears are successively engaged and moved into the desired aligned position while they are being moved forward through the machine, the means for effecting said alignment comprising a member lying horizontally with their first line of movement and having its axis lying below the line of moving ears, having continuous rotary motion imparted to it by contact with said continuously moving conveying means and having means on its periphery for frictionally engaging said moving ears and urging them into the said aligned positions with fixed means against which the ends of the ears contact to maintain their aligned positions and treating means for beginning the removal of the husks from said ears.

In testimony whereof I affix my signature.

MILLAR W. SELLS